(12) United States Patent
Oshima et al.

(10) Patent No.: US 6,937,403 B2
(45) Date of Patent: Aug. 30, 2005

(54) CYLINDRICAL GROOVED CAM FOR LENS DRIVING

(75) Inventors: Shigeru Oshima, Tokyo (JP); Yoshio Yamazaki, Kanagawa (JP)

(73) Assignee: Arc Design, Inc., Tokyo (JP)

( * ) Notice: Subject to any disclaimer, the term of this patent is extended or adjusted under 35 U.S.C. 154(b) by 0 days.

(21) Appl. No.: 10/760,773

(22) Filed: Jan. 20, 2004

(65) Prior Publication Data

US 2005/0157406 A1     Jul. 21, 2005

(51) Int. Cl.$^7$ .............................................. G02B 15/14
(52) U.S. Cl. ...................................... 359/699; 359/700
(58) Field of Search ................................. 359/699, 700, 359/823, 694, 819, 821

(56) References Cited

U.S. PATENT DOCUMENTS 6,538,826 B2 *   3/2003   Koiwai et al. .............. 359/700
6,771,439 B2 *   8/2004   Ting ........................... 359/822

* cited by examiner

Primary Examiner—Georgia Epps
Assistant Examiner—M. Hasan
(74) Attorney, Agent, or Firm—Senniger Powers (57) ABSTRACT

A cylindrical grooved cam with a plurality of grooved cams provided on its inner cylindrical surface comprises an inner tube having at least two guide walls that are provided on its lower edge and represent one guide wall line of the grooved cam to be formed on the inner cylindrical surface; and an outer tube having at least two guide walls that are provided on its upper edge of protruded area on its cylindrical inner surface and represent the other guide wall line of the grooved cam to be formed on the inner cylindrical surface; wherein the inner tube is to be inserted into the outer tube from above so that the guide walls of the inner tube and the counter part guide walls of the outer tube form the grooved cams on the inner cylindrical surface of the cylindrical grooved cam.

2 Claims, 7 Drawing Sheets

CYLINDRICAL GROOVED CAM FOR LENS DRIVING

BACKGROUND OF THE INVENTION

1. Field of the Invention

The invention relates to a cylindrical grooved cam made of plastic, on the inner cylindrical surface of which the grooved cams to control lens driving such as lens zooming or lens focusing of optical equipments like cameras are provided.

2. Background Art

Lenses used for optical equipments like cameras usually have a plastic made cylindrical grooved cam that has grooved cams on its inner cylindrical surface. As the said cylindrical grooved cam rotates, the lenses, which are assembled in a lens barrel and set in the cylindrical grooved cam engaging with the grooved cams through driving pin or raised portion of the lens barrel rim, are moved back and forth for focusing or moved to control the zooming according to the zooming data that are interpreted as cam data and transferred to grooved cams.

The grooved cams are formed on the inner cylindrical surface of the cylinder by plastic molding using a mold which has very complicated construction and is provided usually with a split-core slide. The mold with the split-core slide is very complicatedly designed, and the cost of the mold is extremely expensive.

After an injection of plastic material, a cylindrical grooved cam is formed having grooved cams on its inner cylindrical surface of the cylinder. Then the core-center of the slide must be pulled out of the mold so that the split-core members of the slide can be extracted out of the grooved cams formed on the inner cylindrical surface of the cylinder, and the split-core slide must be pulled out of the mold totally so that the cylindrical grooved cam can be taken out of the mold.

Figure 1:
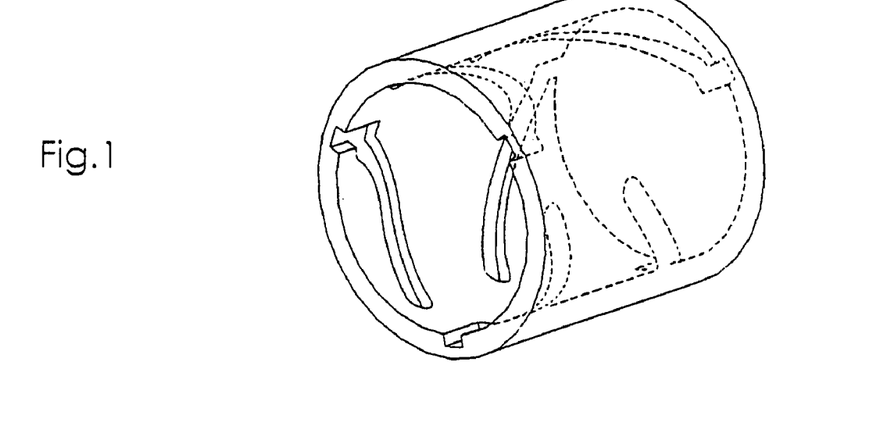
FIG. 1 is a perspective view of conventional type of a cylindrical grooved cam.
Figure 2:
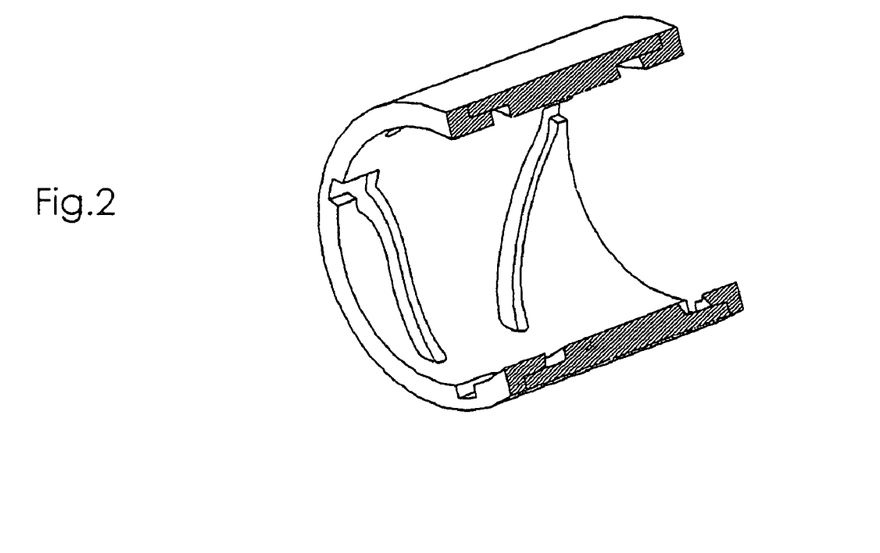
FIG. 2 is a cross-sectional perspective view of conventional type of a cylindrical grooved cam.
Figure 3:
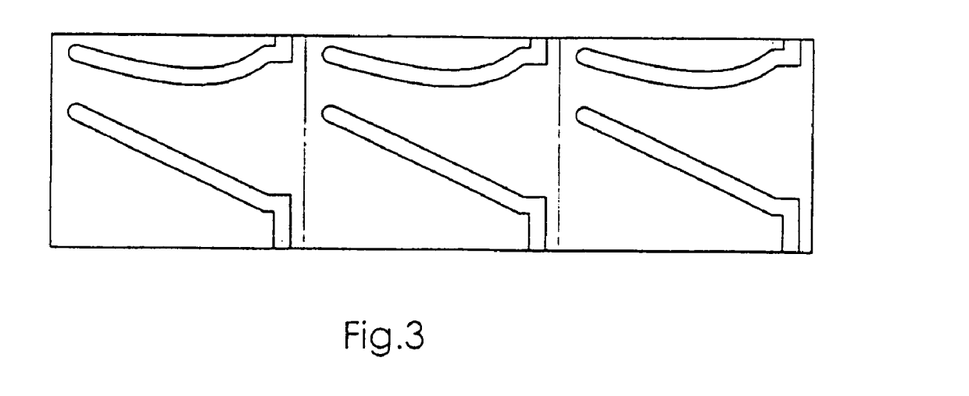
FIG. 3 is a development of a conventional type of a cylindrical grooved cam to show the grooved cams provided on its inner surface.

FIGS. 1 and 2 show a typical cylindrical grooved cam for a zoom lens, which has three grooved cams as a set to control the first group of lenses, and another set of three grooved cams to control the second group of lenses. FIG. 3 is a development of the cylindrical grooved cam to show the grooved cams provided on its inner surface.

Figure 4:
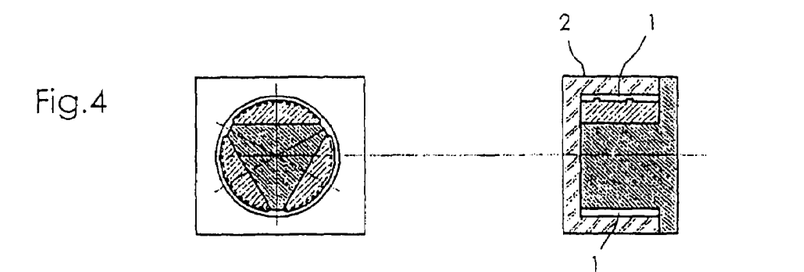
FIG. 4 is for cross-sectional views of a mold to be used for a conventional type of cylindrical grooved cam to show the first stage of molding.

FIG. 4 shows the first stage of molding of the cylindrical grooved cam (1) made of plastic, and the status that the plastic material has been injected into the mold (2), and the cylindrical grooved cam (1) is formed in the mold (2).

Figure 5:
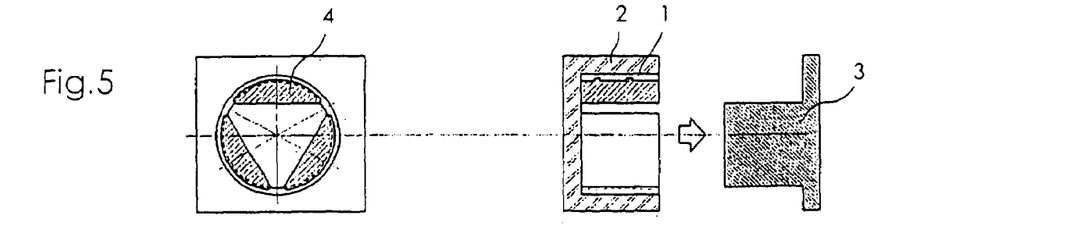
FIG. 5 is for cross-sectional views of a mold to be used for a conventional type of cylindrical grooved cam to show the second stage of molding.

FIG. 5 shows the second stage of molding of the cylindrical grooved cam (1) and the status that core-center (3) of the split-core slide (4) has been pulled out of the mold (2).

Figure 6:
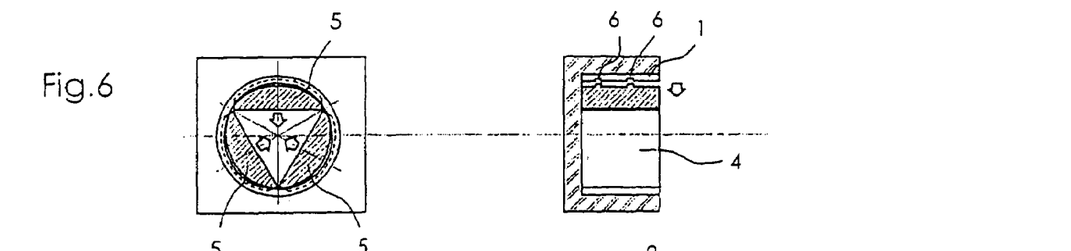
FIG. 6 is for cross-sectional views of a mold to be used for a conventional type of cylindrical grooved cam to show the third stage of molding.

FIG. 6 shows the third stage of molding of the cylindrical grooved cam (1), and the status that the split-core members (5) have been pulled inward coming out of the formed grooved cams (6) so that the split-core slide (4) may come out of the cylindrical grooved cam (1).

Figure 7:
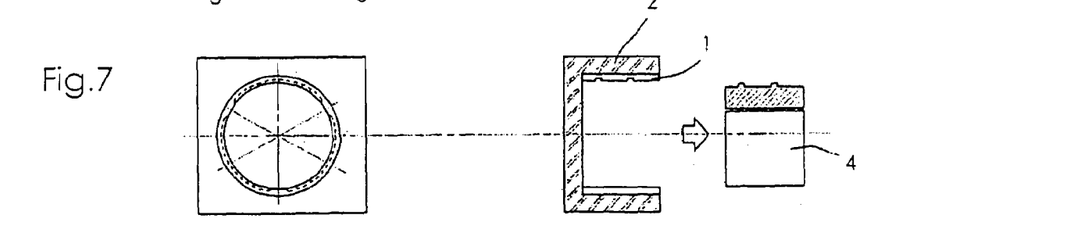
FIG. 7 is for cross-sectional views of a mold to be used for a conventional type of cylindrical grooved cam to show the forth stage of molding.

FIG. 7 shows the forth stage of molding of the cylindrical grooved cam (1), and the status that the whole split-core slide (4) has been pulled out of the mold (2) leaving the molded cylindrical grooved cam (1) inside the mold (2).

Figure 8:
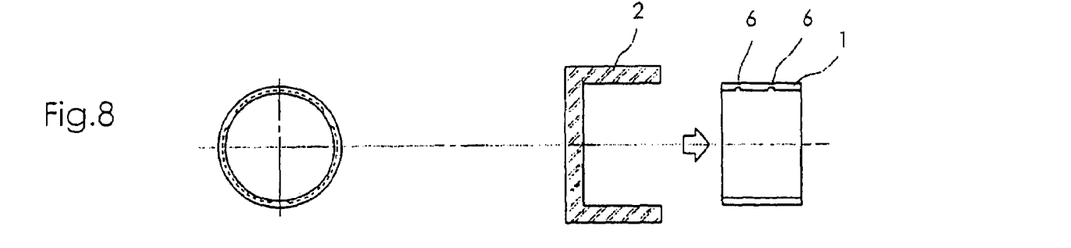
FIG. 8 is for cross-sectional views of a mold to be used for a conventional type of cylindrical grooved cam to show the fifth (final) stage of molding.

FIG. 8 shows the fifth stage (final stage) of the molding of the cylindrical grooved cam (1), and the status that the molded cylindrical grooved cam (1) with the grooved cams (6) on its inner surface has been pulled out of the mold (2).

As mentioned so far, the construction of mold is very complicated and moreover such parts like cylindrical grooved cam for camera lens driving require extreme accuracy that makes the mold making and also plastic injection very difficult and costly.

Figure 9A:
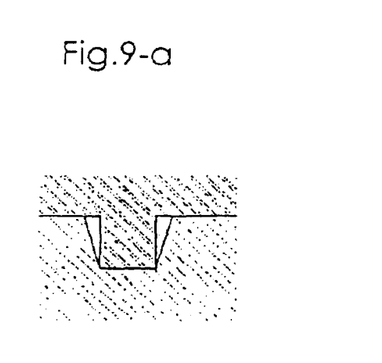
Figure 9B:
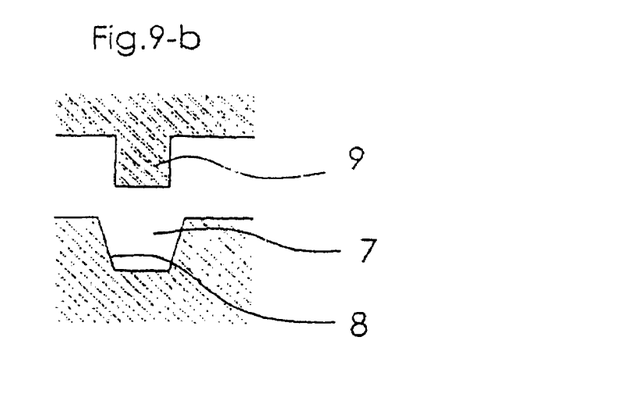
Figures 9C, 9D:
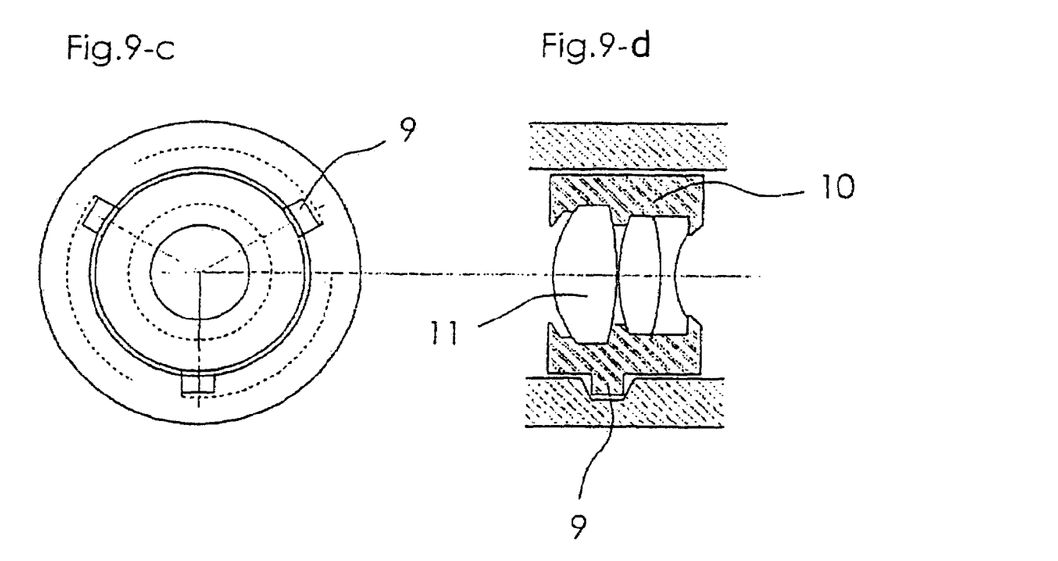

The cylindrical grooved cam that is made with the mold with split-core slide has another problem. As shown by FIGS. 9-*a*, 9-*b*, 9-*c* and 9-*d*, the grooved cams inevitably must be tapered, because the split-core members (5) (FIG. 6) of the slide of the mold must be pulled out of the grooved cams (7) smoothly. Without the taper (8), it is impossible to extract the split-core members (5) out of the grooved cams (7).

Figure 10:
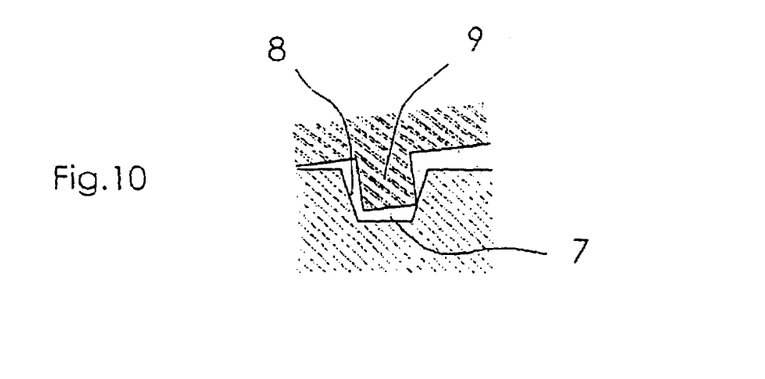
FIG. 10 is a cross-sectional view of conventional grooved cam, from which a raised part of lens holder comes out by shock given to the lens.

Into the grooved cams (7), the raised portions (9) of lens barrel (10), which holds a group of lenses (11) inside, are to be inserted as shown by FIGS. 9-*a*, 9-*b*, 9-*c* and 9-*d*. If a strong shock is given to the whole zoom lens, the raised portions (9) are apt to slip and come out of the grooved cams (7) due to the tapers (8) of the grooved cams (7) as shown by FIG. 10 and it jams the whole zooming control.

The extremely expensive mold with the complicated construction, the delicate and difficult plastic injection control due to the highly required accuracy, and the tapered grooved cams, which are apt to jam the zooming control by a shock, are the problems to be solved for the conventional type of cylindrical grooved cam.

Therefore it is necessary to provide an improved cylindrical grooved cam with the grooved cams provided on its inner cylindrical surface but without any tapers in the grooved cams, which can be made easily by simple molds.

SUMMARY OF THE INVENTION

It is, therefore, one object of the present invention to provide a new type of cylindrical grooved cam with grooved cams provided on its inner cylindrical surface using much less expensive and easily controllable molds.

It is anther object of the present invention to provide a new type of cylindrical grooved cam with the grooved cams provided on its inner cylindrical surface without any tapers.

To achieve the foregoing objects, the present invention uses much simpler molds instead of the mold with the split-core slide, and the simple molds do not have even a slide.

The cylindrical grooved cam of the present invention consists of pairs of tubes. Each tube has parts by which the grooved cams are formed when it is put together with its counterpart tube. The tube can be made with a simple mold which does not have any split-core slide, and the cavity mold and the core mold merely move up and down or back and forth without any complicated sliding movements like extracting the core-center, pulling out the split-core members from the grooved cams and so on.

To make the cylindrical grooved cam of the present invention, it is not necessary to use a mold with split-core slide, and consequently it is not necessary for the grooved cams to be tapered, and the grooved cams can be formed completely flat and horizontally straight, so that the raised portions of lens holding barrel can be inserted into the grooved cams deeply and they do not come out when a strong shock is given.

One advantage of the present invention is that the molds to be used are extremely simple in comparison with the mold needed for the conventional type of cylindrical grooved cam, and consequently the cost of molds can be far much less expensive and easy to make. Another advantage of the present invention is that the grooved cams of the improved cylindrical grooved cam are not tapered and hold the raised

BRIEF DESCRIPTION OF THE DRAWINGS

FIG. 9-$a$ is a cross-sectional view of grooved cam, which is engaged with a raised part of lens holder of conventional type of cylindrical grooved cam;

FIG. 9-$b$ is a cross-sectional view of grooved cam and raised part of a lens holder of conventional type of cylindrical grooved cam showing a tapered grooved cam;

FIG. 9-$c$ is a top view of a lens module with conventional cylindrical grooved cam;

FIG. 9-$d$ is a cross-sectional view of a lens module with conventional cylindrical grooved cam;

FIG. 22-$a$ is a cross-sectional view of a mold to be used for a preferred embodiment of the present invention for a zoom lens;

FIG. 22-$b$ is a cross-sectional view of a mold to be used for a preferred embodiment of the present invention for a zoom lens to show a molded cylindrical grooved cam being removed from the mold;

FIG. 23-$a$ is a cross-sectional view of grooved cam and raised part of lens holder of a preferred embodiment of the present invention showing;

FIG. 23-$b$ is a cross-sectional view of grooved cam of a preferred embodiment of the present invention, which is engaged with a raised part of lens holder tightly;

FIG. 23-$c$ shows a top view of a zoom lens module of a preferred embodiment of the present invention and a cross-sectional view of a part of the module.

DETAILED DESCRIPTION OF THE INVENTION

Figure 11:
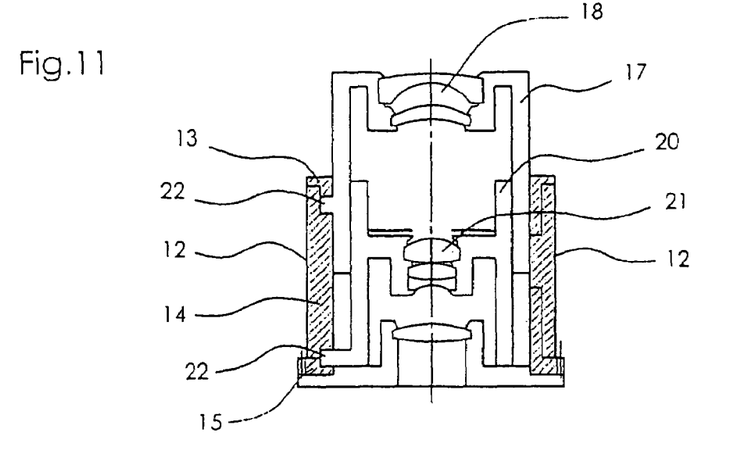
FIG. 11 is a cross-sectional view of a preferred embodiment of the present invention for a zoom lens showing its wide-angle position.

FIG. 11 shows a preferred embodiment of the present invention for a zoom lens, which is assembled with the zoom lens elements and other parts into a zoom lens module, and shows the status that the zoom lens is positioned at the wide-angle position.

Figure 12:
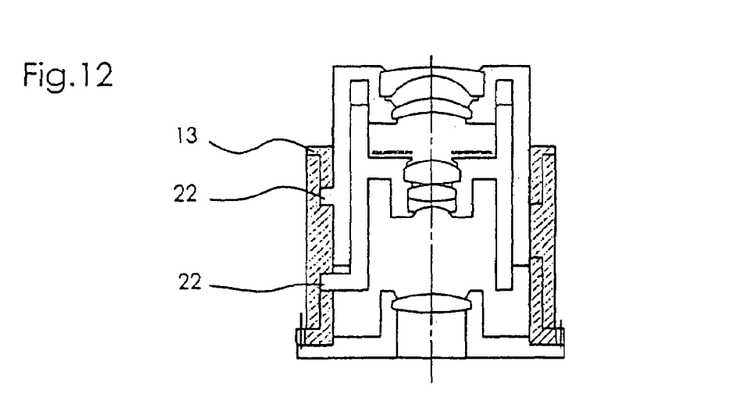
FIG. 12 is a cross-sectional view of a preferred embodiment of the present invention for a zoom lens showing its intermediate zooming position between the telephoto and wide-angle positions.

FIG. 12 shows a preferred embodiment of the present invention for a zoom lens, which is assembled with the zoom lens elements and other parts into a zoom lens module, and shows the status that the zoom lens is positioned at its intermediate zooming position between the telephoto and wide-angle positions.

Figure 13:
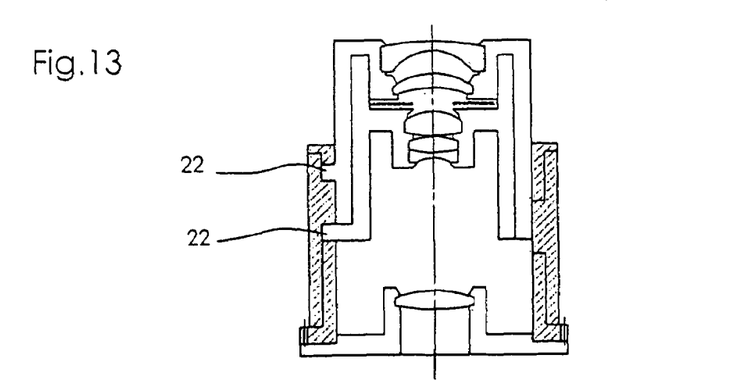
FIG. 13 is a cross-sectional view of a preferred embodiment of the present invention for a zoom lens showing its telephoto position.

FIG. 13 shows a preferred embodiment of the present invention for a zoom lens, which is assembled with the zoom lens elements and other parts into a zoom lens module, and shows the status that the zoom lens is positioned at the telephoto position.

As shown in FIGS. 11, 12 and 13, the cylindrical grooved cam (12) of this invention consists of three tubes, namely an upper inner tube (13), a center outer tube (14) and a lower inner tube (15).

Figure 14:
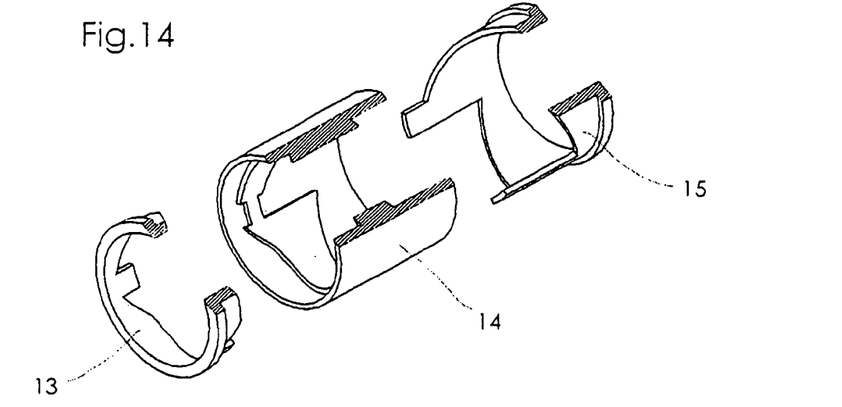
FIG. 14 is an exploded cross-sectional perspective view of a preferred embodiment of the present invention for a zoom lens.
Figure 15:
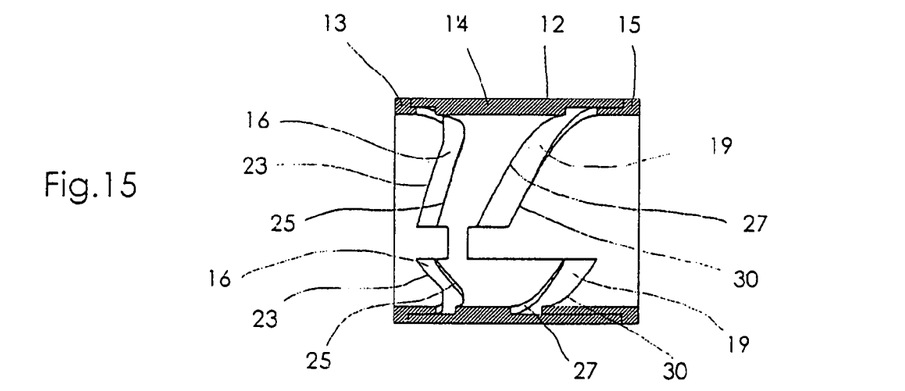
FIG. 15 is a cross-sectional view of a preferred embodiment of the present invention for a zoom lens.

FIG. 14 shows those three tubes disassembled showing the upper inner tube (13), the center outer tube (14) and the lower inner tube (15) individually, and FIG. 15 shows the cross section of the cylindrical grooved cam (12) of the present invention, which is assembled with the three tubes together.

Figure 16:
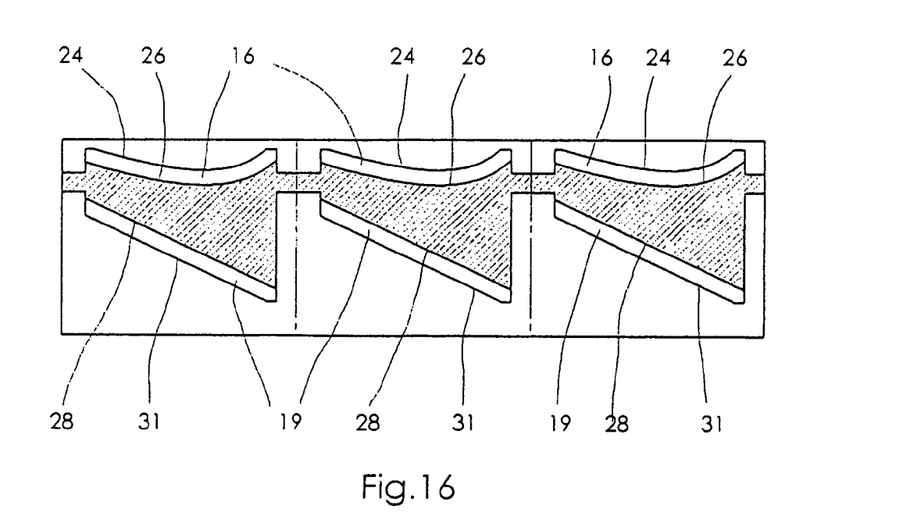
FIG. 16 is a development of a preferred embodiment of the present invention for a zoom lens.

FIG. 16 is a development of the cylindrical grooved cam (12) of the present invention with typical curves of grooved cams to be provided on its inner cylindrical surface. The upper grooved cams (16) are needed for the lens barrel (17) (FIG. 11) of the first group of lenses (18) (FIG. 11), and the lower (second) grooved cams (19) are needed for the lens barrel (20) (FIG. 11) of the second lens group of lenses (21) (FIG. 11).

Figure 23A:
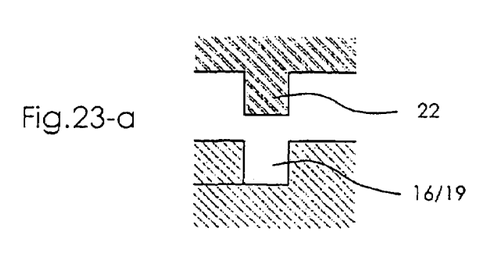
Figure 23B:
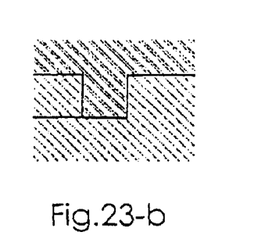
Figure 23C:
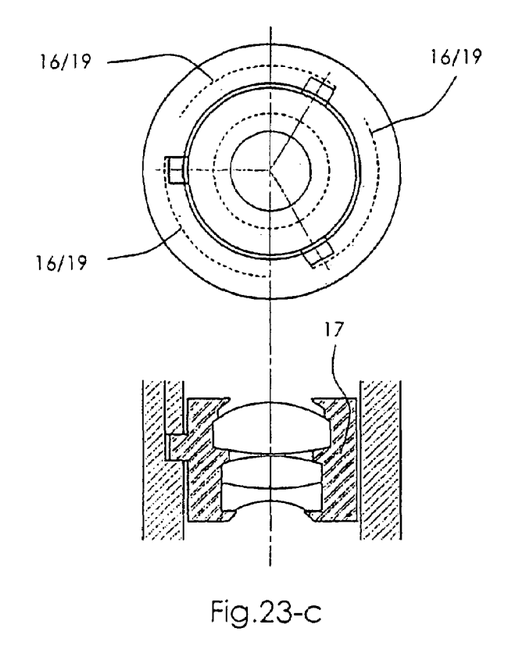

As shown by FIGS. 11, 12 and 13, the first and second groups of lenses (18 & 21) are assembled in each lens barrel (17 & 20), and the raised portions (22) (FIG. 11) provided on the rim of the lens barrels (17 & 20) are engaged with the grooved cams (16 & 19)) of the cylindrical grooved cam (12) of the present invention also as shown by FIGS. 23-*a* and 23-*b*.

Figure 17:
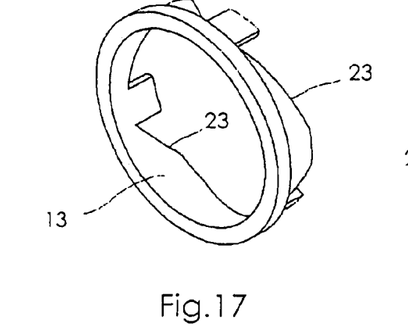
FIG. 17 is a perspective view of an upper inner tube of a preferred embodiment of the present invention for a zoom lens.

FIG. 17 shows the upper inner tube (13). The upper inner tube (13) has three guide walls (23) provided at the lower edge of the upper inner tube (13), and the guide walls (23) of the upper inner tube (13) represent the upper cam lines of the first grooved cams (16) (FIG. 16), namely curved lines (24) as shown in FIG. 16. It should be noted that the upper inner tube (13) having two guide walls (23) is also possible.

Figure 18:
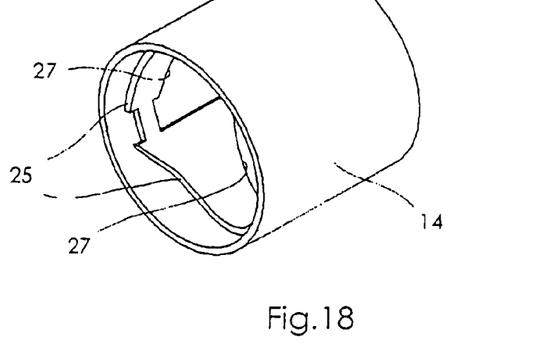
FIG. 18 is a perspective view of a center outer tube of a preferred embodiment of the present invention for a zoom lens.

FIG. 18 shows the center outer tube (14). The center outer tube (14) has three upper guide walls (25) provided at the upper edge of protruded part on the inner surface of the center outer tube (14), and the upper guide walls (25) of the center outer tube (14) represent the lower cam lines of the first grooved cams (16), namely curved lines (26) as shown in FIG. 16. It should be noted that the center outer tube (14) having two upper guide walls (25) is also possible.

Figure 19:
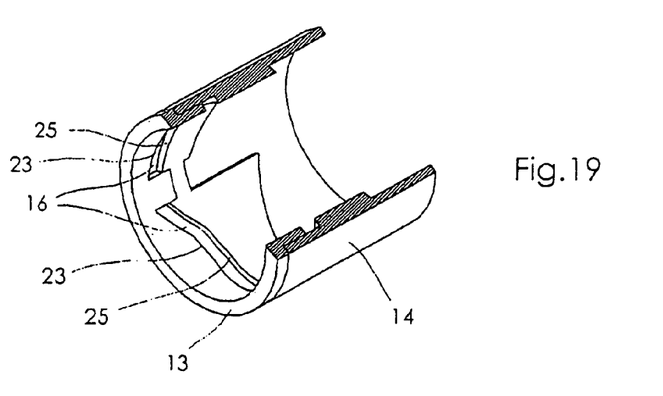
FIG. 19 is a cross-sectional perspective view of an upper inner tube and a center outer tube of a preferred embodiment of the present invention for a zoom lens, which are assembled together as one piece.

When the upper inner tube (13) is inserted into the upper part of the center outer tube (14), each guide wall (23) provided on the lower edge of the upper inner tube (13) is fit together with its counterpart guide wall (25) provided at the upper edge of protruded part on the inner surface of the center outer tube (14) making three grooved cams. The grooved cams (16) are formed by the upper guide walls (23) provided at the lower edge of the upper inner tube (13) and the lower guide walls (25) provided at the upper edge of protruded part on the inner surface of the center outer tube (14) as shown by FIG. 19.

The center outer tube (14) has three lower guide walls (27) also provided at the lower edge of protruded part on the inner surface of the center outer tube (14), and the lower guide walls (27) of the center outer tube (14) represent the upper cam lines of the lower (second) grooved cams (19), namely the lines (28) as shown in FIG. 16. It should be noted that the center outer tube (14) having two lower guide walls (27) is also possible.

Figure 20:
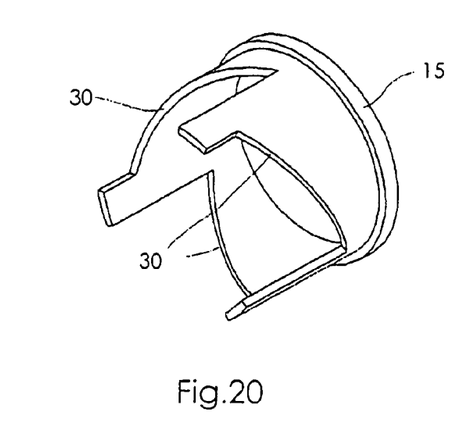
FIG. 20 is a perspective view of a lower inner tube of a preferred embodiment of the present invention for a zoom lens.

FIG. 20 shows the lower inner tube (15). The lower inner tube (15) has three guide walls (30) provided at the upper edge of the lower inner tube (15), and the guide walls (30) of the lower inner tube (15) represent the lower cam lines of the lower (second) grooved cams (19), namely the lines (31) as shown in FIG. 16. It should be noted that the lower inner tube (15) having two guide walls (30) is also possible.

Figure 21:
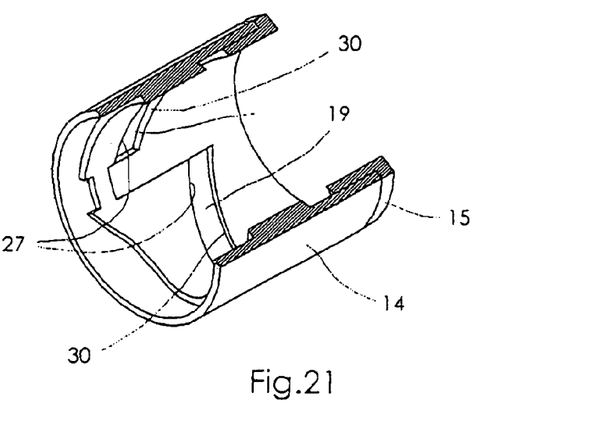
FIG. 21 is a cross-sectional perspective view of a lower inner tube and a center outer tube of a preferred embodiment of the present invention for a zoom lens, which are assembled together as one piece.

When the lower inner tube (15) is inserted into the lower part of the center outer tube (14), each guide wall (30) provided on the upper edge of the lower inner tube (15) is fit together with its counterpart guide wall (27) provided at the lower edge of protruded part on the inner surface of the center outer tube (14) making three grooved cams. The grooved cams (19) are formed by the upper guide walls (30) provided at the upper edge of the lower inner tube (15) and the lower guide walls (27) provided at the lower edge of protruded part on the inner surface of the center outer tube (14) as shown by FIG. 21.

As shown by FIG. 15 when the three tubes, namely the upper inner tube (13), the center outer tube (14) and the lower inner tube (15), are assembled together, a complete cylindrical grooved cam (12) of the present invention is formed with the grooved cams provided on the inner cylindrical surface of the assembled cylindrical grooved cam (12). FIG. 15 also shows that the two sets of grooved cams are formed on the inner cylindrical surface. The first (upper) set of grooved cams (16) are formed by the lower edge wall guides (23) of upper inner tube (13) and the upper edge wall guide (25) of center outer tube (14), and the second (lower) set of grooved cams (19) are formed by lower edge wall guides (27) of center outer tube (14) and the upper edge wall guide (30) of lower inner tube (15).

Figure 22A:
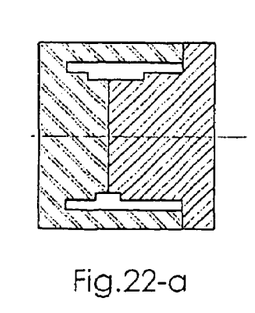
Figure 22B:
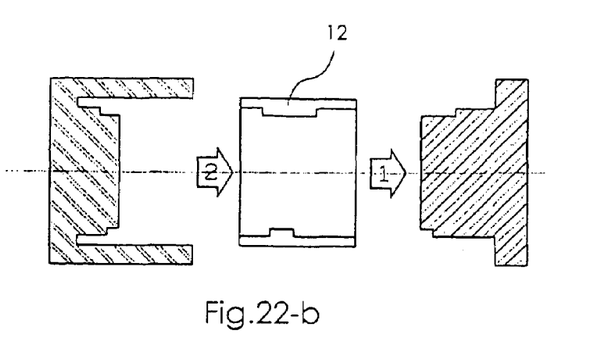

Thus the cylindrical grooved cam (12) of the present invention with grooved cams (16 & 19) provided on its inner cylindrical surface can be provided using three simple tubes, and the molds to be used for those three tubes are very simple without any split-core slides or the like. FIGS. 22-*a* and 22-*b* show an example of such a simple mold construction for making the tubes.

Since the molds do not have any inner split-core slide, it is not necessary for the grooved cams to be tapered, and can be flat and horizontally straight and the raised portions (22) of lens holding barrels (17 & 20) (FIG. 11) can be inserted into the grooved cam (16 & 19) straightly without any play caused by tapers as show by FIGS. 23-*a* and 23-*b*.

Figure 24:
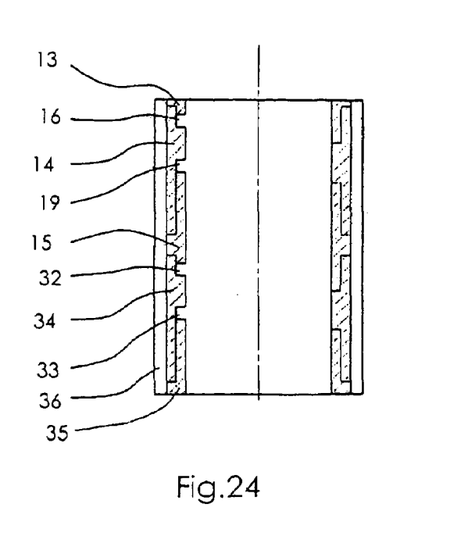
FIG. 24 is a cross-sectional view of a cylindrical grooved cam of a preferred embodiment of the present invention, which has 4 sets of grooved cams on its inner surface.

It is possible to have more grooved cams than 2 sets of cams by increasing the numbers of the tubes and adding an outer tube. FIG. 24 shows a zoom cylindrical grooved cam of the present invention with 4 sets of grooved cams (16, 19, 32 and 33), which is formed by adding 2 more tubes (34 & 35) and an additional outer tube (36).

What is claimed is:

1. A cylindrical grooved cam with a plurality of grooved cams provided on its inner cylindrical surface comprising:
   an inner tube having at least two guide walls that are provided on its lower edge and represent one guide wall line of the grooved cam to be formed on the inner cylindrical surface; and
   an outer tube having at least two guide walls that are provided on its upper edge of protruded area on its cylindrical inner surface and represent the other guide wall line of the grooved cam to be formed on the inner cylindrical surface;
   wherein the inner tube is to be inserted into the outer tube from above so that the guide walls of the inner tube and the counter part guide walls of the outer tube form the grooved cams on the inner cylindrical surface of the cylindrical grooved cam.

2. A cylindrical grooved cam as claimed in 1, wherein another set of grooved cams can be provided additionally by having at least two guide walls provided on the lower edge of protruded area on the cylindrical inner surface of the outer tube, which represent one guide wall line of the said additional grooved cams and by adding another inner tube having at least two guide walls that represent the other guide wall line of the said additional grooved cams, and the additional inner tube is fit into the outer tube from below so that the added guide walls, which are provided at the lower edge of outer tube and at the upper edge of the additional inner tube, may form the second set of grooved cams.

* * * * *